United States Patent
Burbank et al.

(10) Patent No.: US 11,849,185 B2
(45) Date of Patent: Dec. 19, 2023

(54) METHOD AND SYSTEM FOR TRIGGERING USE OF A VIDEO-ON-DEMAND SERVICE BY A MEDIA PRESENTATION DEVICE

(71) Applicant: The Nielsen Company (US), LLC, New York, NY (US)

(72) Inventors: John R. Burbank, New York, NY (US); Kurt R. Thielen, Maple Grove, MN (US)

(73) Assignee: The Nielsen Company (US), LLC, New York, NY (US)

( * ) Notice: Subject to any disclaimer, the term of this patent is extended or adjusted under 35 U.S.C. 154(b) by 67 days.

(21) Appl. No.: 15/929,192

(22) Filed: Dec. 19, 2019

(65) Prior Publication Data

US 2020/0204866 A1 Jun. 25, 2020

Related U.S. Application Data

(60) Provisional application No. 62/784,520, filed on Dec. 23, 2018.

(51) Int. Cl.
*H04N 21/4627* (2011.01)
*H04N 21/431* (2011.01)
(Continued)

(52) U.S. Cl.
CPC ..... *H04N 21/47202* (2013.01); *H04N 21/431* (2013.01); *H04N 21/4532* (2013.01); *H04N 21/4627* (2013.01); *H04N 21/4882* (2013.01)

(58) Field of Classification Search
CPC .......... H04N 21/47202; H04N 21/431; H04N 21/4532; H04N 21/4627; H04N 21/4882
(Continued)

(56) References Cited

U.S. PATENT DOCUMENTS 9,769,530 B2  9/2017 Lemus et al.
10,110,939 B1 * 10/2018 Wittke ................. H04N 21/482
(Continued)

FOREIGN PATENT DOCUMENTS

KR     20150134007      12/2015

OTHER PUBLICATIONS

International Search Report and Written Opinion from International Application No. PCT/US2019/067718, dated May 21, 2020.

*Primary Examiner* — Nathan J Flynn
*Assistant Examiner* — Caroline Somera
(74) *Attorney, Agent, or Firm* — McDonnell Boehnen Hulbert & Berghoff LLP

(57) ABSTRACT

A computing system detects that a media presentation device such as a television is in a content-selection mode in which a user is likely to select video content to be presented by the media presentation device, at a time when the media presentation device is not using a video-on-demand service. In response, the computing system causes the media presentation device to present a prompt for user approval to have the media presentation device present video content of the video-on-demand service. By presenting this prompt at a time when the media presentation device is in a content-selection mode and is not using the video-on-demand service, the disclosed mechanism can thereby help foster use of the video-on-demand service.

17 Claims, 7 Drawing Sheets

(51) Int. Cl.
*H04N 21/472* (2011.01)
*H04N 21/488* (2011.01)
*H04N 21/45* (2011.01)

(58) Field of Classification Search
USPC .......................................................... 725/34
See application file for complete search history.

(56) References Cited

U.S. PATENT DOCUMENTS

| | | | |
|---|---|---|---|
| 11,194,546 B2* | 12/2021 | Christie | H04N 21/4788 |
| 2004/0019900 A1* | 1/2004 | Knightbridge | G06Q 30/0277 |
| | | | 725/23 |
| 2008/0235278 A1 | 9/2008 | Piepenbrink et al. | |
| 2010/0153997 A1* | 6/2010 | Baumgartner | H04N 21/47202 |
| | | | 725/39 |
| 2010/0251311 A1 | 9/2010 | Arocca et al. | |
| 2011/0191163 A1* | 8/2011 | Allaire | H04N 21/23892 |
| | | | 705/14.39 |
| 2011/0307925 A1* | 12/2011 | Vaysman | H04N 21/4316 |
| | | | 725/48 |
| 2012/0102531 A1 | 4/2012 | Schlack | |
| 2012/0185886 A1* | 7/2012 | Charania | H04N 21/8173 |
| | | | 725/2 |
| 2012/0284763 A1* | 11/2012 | Choi | H04N 21/4622 |
| | | | 725/110 |
| 2013/0205318 A1 | 8/2013 | Sinha et al. | |
| 2014/0123168 A1* | 5/2014 | Reisman | H04L 69/329 |
| | | | 725/25 |
| 2014/0245354 A1* | 8/2014 | Kunkel | H04N 21/47202 |
| | | | 725/44 |
| 2015/0089371 A1* | 3/2015 | Zaslavsky | G06F 3/0482 |
| | | | 715/716 |
| 2015/0143395 A1* | 5/2015 | Reisman | H04N 21/47202 |
| | | | 725/14 |
| 2016/0029095 A1* | 1/2016 | Poniatowski | G06F 3/0482 |
| | | | 725/58 |
| 2016/0119678 A1* | 4/2016 | Odryna | H04N 21/4622 |
| | | | 725/49 |
| 2017/0055039 A1* | 2/2017 | Earle | H04N 21/4622 |
| 2017/0094332 A1* | 3/2017 | Thomas | H04N 21/25883 |
| 2017/0118500 A1* | 4/2017 | Carroll | H04N 21/26258 |
| 2018/0189076 A1* | 7/2018 | Liston | G06F 9/4451 |
| 2018/0192117 A1* | 7/2018 | Liston | H04N 21/4532 |
| 2018/0192130 A1* | 7/2018 | Liston | H04N 21/441 |
| 2018/0310044 A1* | 10/2018 | Wittke | H04N 21/83 |
| 2018/0343476 A1* | 11/2018 | Loheide | H04N 21/2353 |
| 2019/0141398 A1* | 5/2019 | Auxer | G06Q 50/01 |
| 2019/0320233 A1* | 10/2019 | Zhao | H04N 21/4181 |
| 2020/0053428 A1* | 2/2020 | Seely | H04N 21/4667 |
| 2020/0304863 A1* | 9/2020 | Domm | H04H 20/38 |

* cited by examiner

METHOD AND SYSTEM FOR TRIGGERING USE OF A VIDEO-ON-DEMAND SERVICE BY A MEDIA PRESENTATION DEVICE

REFERENCE TO RELATED APPLICATION

This application claims priority to U.S. Provisional Patent Application No. 62/784,520, filed Dec. 23, 2018, the entirety of which is hereby incorporated by reference.

BACKGROUND

A typical media presentation device (MPD) operates to receive analog or digital media streams representing video content (e.g., multimedia content including a video component) and to render the media content for presentation on a user interface such as a display screen. A representative example of such a device is a television. Without limitation, other examples include computer monitors, smart phones, and projection systems.

A television could be configured to receive and render various channels of video content distributed by one or more content distribution systems, such as cable, satellite, or terrestrial over-the-air broadcast systems. For instance, a television could include or be interconnected with a tuner and/or receiver (e.g., set top box) that allows user selection of a channel, such as a national or local broadcast feed for example, and tunes to and provides content of the user-selected channel for rendering and presentation by the television.

Further, a television could be configured to receive and render video-on-demand (VOD) content. For instance, a television could be interconnected with a streaming media player such as a ROKU, APPLE TV, AMAZON FIRE TV, or CHROMECAST device, that allows user-selection of a VOD service from multiple available VOD services (e.g., respective VOD applications) and user selection of particular video content, such as movies or television programs, offered by a selected VOD service, and that operates to receive and provide the user-selected video content for rendering and presentation by the television. Still further, some smart televisions come internally pre-equipped with such media-player functionality.

SUMMARY

One problem with implementation of VOD services is that a user may repeatedly access the same VOD services over and over and may not experiment with or learn about other useful and/or entertaining VOD services. For example, every time a user browses for movie or television-program content to watch, the user may access the same set of one or more VOD applications on the user's media player, even though the media player supports one or more other VOD services that may offer a greater or different variety of movie and television program content and/or that have other useful features. In practice, the user may be unaware of those other VOD services, or the user may simply not make an effort to explore the other VOD services.

The present disclosure provides a technical mechanism to help incentivize and facilitate use of a given VOD service, by causing an MPD to present a timely and relevant prompt for user approval of the MPD presenting content of the given VOD service. In particular, at a time when the given VOD service is not in use at the MPD (e.g., when the MPD is not presenting any video content from the given VOD service and is not presenting a content-selection menu of given the VOD service), a computing system will detect that the MPD is in a mode where a user is likely to select content to watch, and the computing system will responsively cause the MPD to present a prompt for user approval for the MPD to present content of the given VOD service.

By way of example, the computing system could detect, based on machine analysis of video content presented by the MPD, that the MPD is currently presenting a menu of VOD services such as a page depicting icons of various VOD applications from which a user could select a VOD application to use, and the MPD could responsively present a video overlay that prompts the user to approve having the MPD present content of the given VOD service. Further, the computing system could cause the user-approval prompt to be presented specifically in response to detecting based on such machine analysis that a VOD service other than the given VOD service is currently highlighted for user selection in such a menu of VOD services, perhaps where a user has navigated through the menu to the another such VOD application but has not yet selected it.

As another example, the computing system could detect, based on similar machine analysis, that the MPD is currently presenting a content-selection menu of another VOD service or has just finished presenting a content item (e.g., a movie or television program) of the other VOD service, and the computing system could responsively present a video overlay that prompts the user to approve having the MPD present content of the given VOD service. In this case, presenting the user-approval prompt could help to facilitate having the MPD transition from using the other VOD service to using the given VOD service.

Still further, as another example, the computing system could detect through machine analysis or other processing logic that the MPD has just powered on, which might be another situation where a user is likely to select new VOD content to watch. And in response, the computing system could then likewise present a prompt for the user to approve having the MPD present content of the given VOD service.

In a further aspect, the present disclosure also provides for using automatic content recognition (ACR) as a basis to identify a type of content, such as a particular genre, that a user of the MPD may enjoy watching, and for responsively configuring the user-approval prompt to be a prompt for approval to have the MPD present content specifically of that identified type provided by the given VOD service.

For instance, a network-based ACR server could identify, through digital fingerprint analysis, watermarking, and/or one or more other ACR techniques, various content items (e.g., movies, television programs, etc.) recently presented by the MPD and/or by one or more associated MPDs, and the ACR server or another entity could determine a genre and/or one or more other attributes of such content items. When the computing system then detects that the MPD is in a content-selection mode, the computing system could cause the MPD to present a prompt for user approval to have the MPD present content that has been selected based on the content being of that particular determined genre or having the particular determined one or more other attributes. Presenting such a timely prompt for user approval to have the MPD present such content of interest from the given VOD service could thereby further help incentivize use of the given VOD service.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
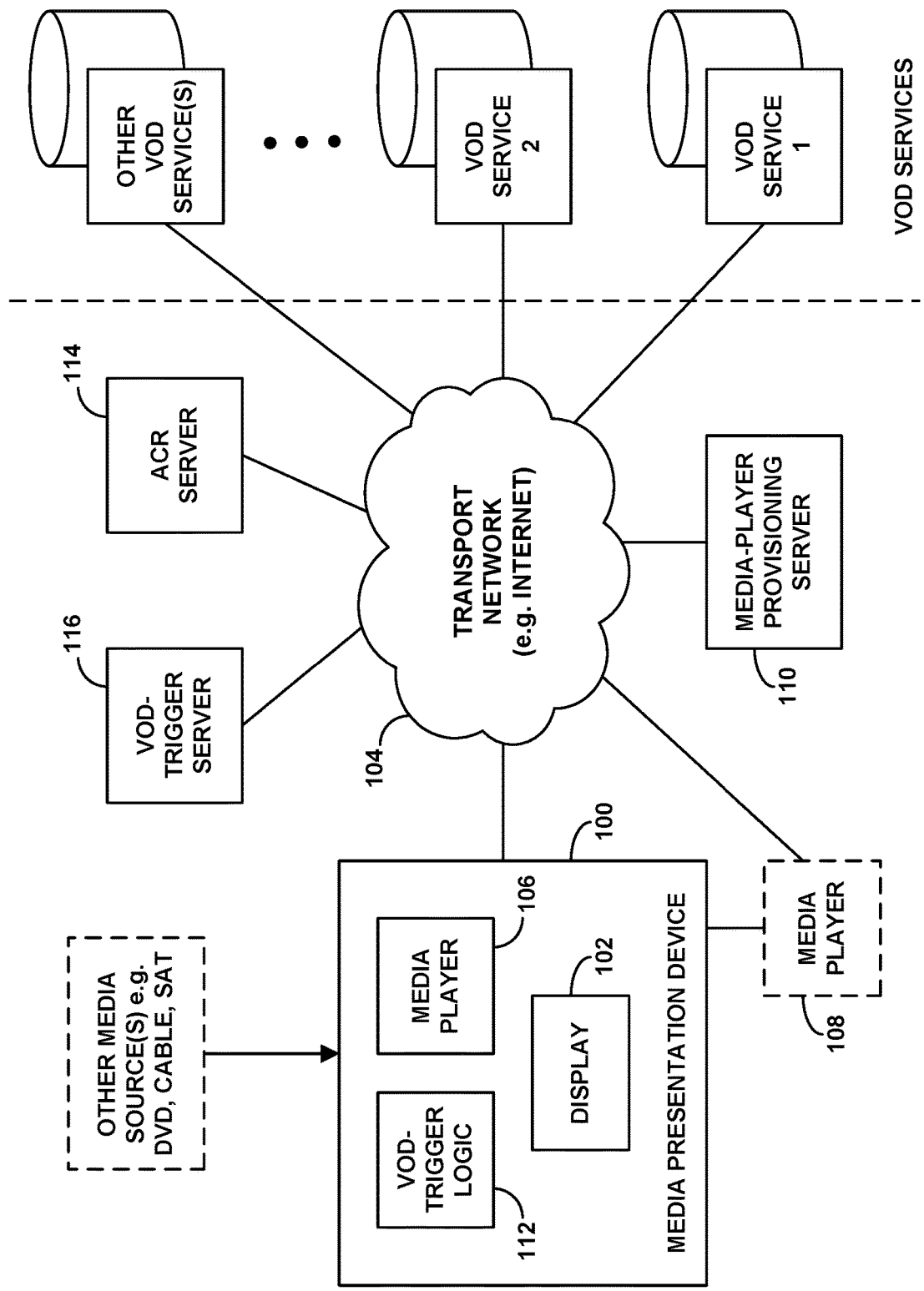
FIG. 1 is a simplified block diagram of an example arrangement in which various disclosed principles can be implemented.

Referring to the drawings, as noted above, FIG. 1 is a simplified block diagram of an example arrangement in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

FIG. 1 depicts a representative MPD 100, which could be or include a television or any other type of MPD configured to receive and render video content for presentation on an integrated or externally connected user interface, such as a display screen 102. As shown, the MPD 100 is interconnected with a transport network 104, such as the Internet, which provides direct or indirect connectivity with various VOD services, including VOD-service 1 and VOD-service 2, among possibly others.

Each illustrated VOD service could be operated and provided by a respective VOD service provider under a respective VOD brand name. For simplicity, this description will refer to VOD-service 1 as brand "VOD1" and VOD-service 2 as brand "VOD2," although the actual brand names of these services would probably be more distinctive.

Each VOD service could take various forms, likely comprising one or more servers (not shown) configured to facilitate delivery of VOD content to media players for presentation by MPDs such as MPD 100. For example, a representative VOD service could include a content-selection server, such as a web server or the like, configured to transmit to a media player a menu of video-content items that are available for user selection to be streamed from the VOD service to the media player. And the representative VOD service could include a media server and an associated signaling server, cooperatively configured to establish streaming media sessions with the media player and to stream video-content items upon request to the media player.

The representative MPD 100 is shown including an integrated media player 106, which could be defined by program logic (e.g., program instructions) stored in the MPD 100 that are executable by a processing unit of the MPD 100. For instance, the media player 106 could be defined as application-layer logic running on top of an operating system of the MPD 100 or could be integrated in the operating system of the MPD 100, among other possibilities.

Further, the representative MPD 100 is shown having an externally connected media player device 108. In an example implementation, for instance, the MPD 100 could include a multi interface such as a High-Definition Multimedia Interface (HDMI) for connecting peripheral devices, and the external media player device 108 could be coupled with the MPD 100 through this interface.

Each such media player 106, 108 could be configured to interoperate with various VOD services, such as VOD1 and VOD2, to facilitate receipt of VOD content for presentation by MPD 100.

In an example implementation, for instance, the media player could be configured to initially obtain and provide a menu of various such VOD services that are available for user selection, and the media player could be configured to receive input representing user selection of a particular such VOD service from the menu of available VOD services. Further, the media player could be configured to request and receive from the user-selected VOD service a menu of video-content items that are available for user selection to be streamed from that VOD service to the media player. And the media player could be configured to receive user selection of a desired video-content item from the menu of available video-content items, to responsively request and receive the selected video-content item from the VOD service, to receive the requested video-content item in a streaming-media session from the VOD service, and to play out the received video-content item in real-time for presentation the MPD 100.

Specifics of these processes, including the signaling protocols used and other details, could take various forms.

By way of example, the media player could make use of basic Hypertext Transfer Protocol (HTTP) signaling and web-browser functionality to obtain the menu of available VOD services from a media-player provisioning server 110, such as a provisioning server operated by a provider of the media player. For instance, the media player or associated logic could generate and send an HTTP GET request message to the media-player provisioning server 110 and could receive in response from the provisioning server 110 an HTTP response message that carries a markup document representing a VOD-service-selection menu that could be rendered for presentation by the MPD 100.

Figure 2:
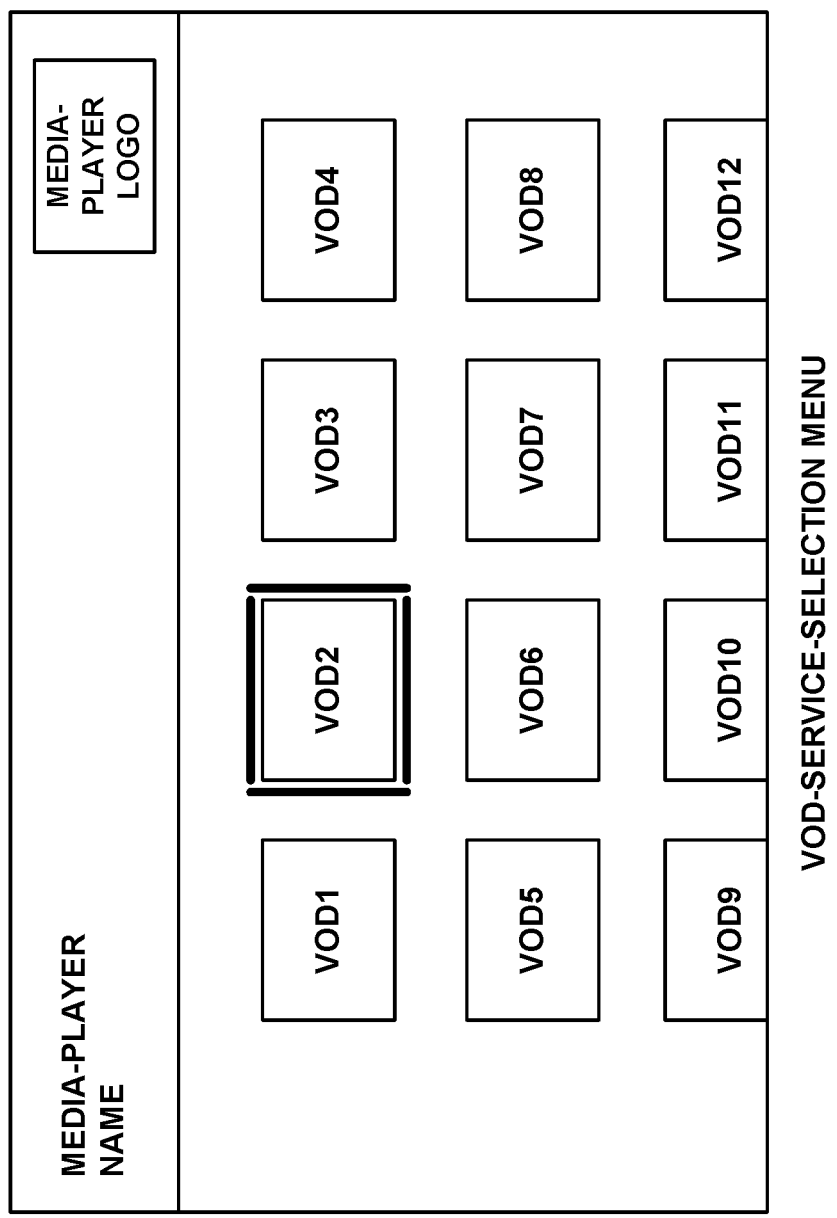
FIG. 2 is an illustration of an example VOD-service-selection menu.

This markup document could define a graphical layout and associated functionality of the menu of available VOD services, an example of which is shown by FIG. 2.

As shown in FIG. 2, the menu of available VOD services could provide an array of VOD-service objects (e.g., graphical icons, text, etc.) representing the various available VOD services, showing for each VOD-service object a name or other brand identity of the VOD service, to facilitate user selection of a desired VOD service from the menu. Further, the markup document defining this graphical layout could be coded to make each such VOD-service object an actionable hyperlink that points to a universal resource identifier (URI) of the associated VOD service, and to highlight (e.g., with an outer glow, color change, or the like) each VOD-service object to which a user navigates for possible selection.

Upon receipt of this markup document, the media player or associated logic could thus render the markup document for presentation of the menu of available VOD services by the MPD 100. And with the menu of available VOD services being presented by the MPD 100, a user could then use a navigation/selection mechanism such as a remote control to navigate to and select a desired one of the listed VOD services. For instance, as shown in FIG. 2, the user could navigate to VOD2, which may cause the presentation of the VOD-service menu by the MPD 100 to show an outer glow around the VOD2 object, and the user might then press an OK button or otherwise select VOD2.

Once the user has selected a desired VOD service, the media player could then likewise use HTTP signaling and web-browser functionality to obtain from that selected VOD service a menu of video-content items available for streaming from that VOD service. For instance, once the user selects VOD2, the media player or associated logic could generate and send an HTTP GET request message to URI of VOD2 and could receive in response from VOD2 an HTTP response message that carries a markup document representing a video-content-item menu that could be rendered for presentation by the MPD 100.

Figure 3:
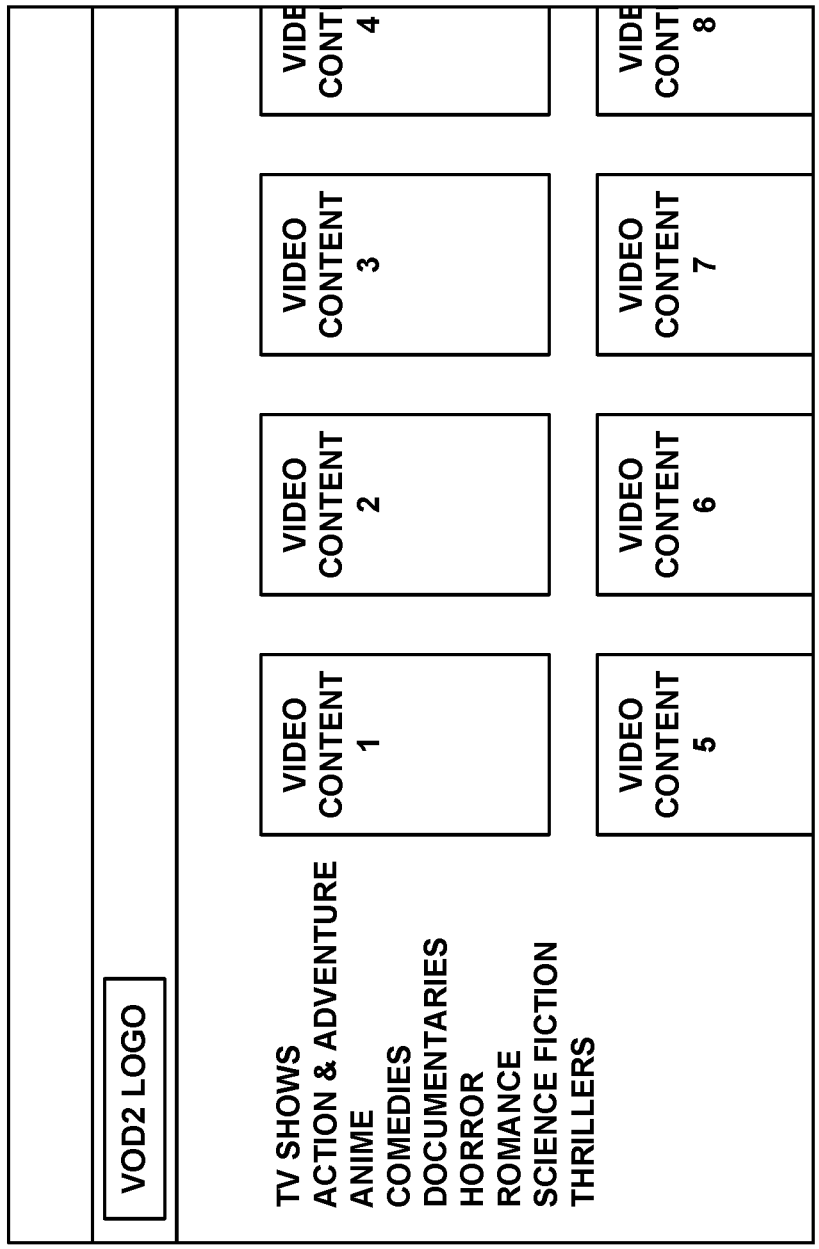
FIG. 3 is an illustration of an example video-content-selection menu of a given VOD service.

This markup document could define a graphical layout and associated functionality of the menu of available video-content items, an example of which is shown by FIG. 3.

As shown in FIG. 3, the menu of video-content items available from VOD2 might provide an array of video-content objects (e.g., thumbnail images, trailer videos, or the like) representing the various available video-content items, along with text and/or other descriptors of the video-content items. Further, the markup document defining this graphical layout could be coded to make each such video-content object an actionable hyperlink or the like that points to a URI of the associated video-content item, and to highlight (similarly with an outer glow, color change, or the like) each video-content object to which a user navigates for possible selection.

Upon receipt of this markup document, the media player or associated logic could thus render the markup document for presentation of the menu of available video-content content items by the MPD 100. And with the menu of available video-content items being presented by the MPD 100, a user could then likewise navigate to and select a desired one of the listed video-content items. For instance, as shown in FIG. 3, the user could navigate to MOVIE1, which may cause the presentation of the video-content-item menu by the MPD 100 to show an outer glow around the MOVIE1 object, and the user might then press an OK button or otherwise select MOVIE1 to initiate playing of MOVIE1.

Once the user has selected a desired video-content item for playout from VOD2, the media player and VOD2 could interwork to establish a streaming-media session through which VOD2 will stream the video-content item for real-time playout and presentation by the MPD 100. In an example implementation, without limitation, this streaming could be done using protocols such as the Real-time Transport Protocol (RTP) and the Real-time Streaming Protocol (RTSP).

For instance, in response to the user selection of MOVIE1, the media player could generate and send to the URI associated with MOVIE1 an RTSP SETUP request message requesting setup of an RTP session for real-time streaming of MOVIE1. And VOD2 could return an RTSP SETUP response message that describes parameters of the session. After possible further signaling between the media player and the VOD2, the media player could then send to VOD2 an RTSP PLAY message to initiate the streaming media session. And upon receipt of the PLAY request, VOD2 could begin transmitting MOVIE1 to the media player as payload in a sequence of RTP packets. As the media player receives these RTP packets, the media player could then buffer the packet payload and play out MOVIE1 in real-time for presentation by the MPD 100.

Note that the above-described menus and associated information could alternatively be cached locally at the media player, possibly updated from time to time, to facilitate having the media player more readily present the menus and respond to user selections. Other arrangements are possible as well. Likewise, the media player may pre-establish a streaming media session with a VOD service to facilitate quicker delivery of a requested video-content item from the VOD service to the media player.

In a representative example, the program logic that defines media player 106 of MPD 100 could further provide an application programming interface (API) that defines commands through which a host processor of the MPD 100 could cause the media player 106 to carry out certain media-player operations. Through this API, for instance, the host processor may direct and cause the media player to request, receive, and render for presentation by the MPD 100 a particular video-content item from a specified URI.

As noted above, the present disclosure provides a mechanism for triggering use of a particular VOD service when MPD 100 is in a content-selection mode and is not currently using that VOD service. Continuing with the example above, for instance, this mechanism could be used to trigger use of VOD1 at a time when the MPD 100 is in content-selection mode and is not currently using VOD1.

To facilitate this, the MPD 100 could include and apply client-side VOD-trigger logic 112. As with the media player 106, the client-side VOD-trigger logic 112 could be defined by program logic stored that is stored in the MPD 100 and is executable by a processing unit of the MPD 100 to cause the MPD 100 to carry out various operations. For instance, the client-side VOD-trigger logic 112 could be defined as application-layer logic running on top of an operating system of the MPD 100 or could be integrated in the operating system of the MPD 100, among other possibilities.

In accordance with the client-side VOD-trigger logic 112, (i) the MPD 100 could detect when the MPD 100 is in a content-selection mode at a time when the MPD 100 is not currently using VOD1, and (ii) responsive to at least detecting that the MPD 100 is in the content-selection mode at a time when the MPD 100 is not currently using VOD1, the MPD 100 could present a prompt for user approval to have MPD 100 present video-content of VOD1 and/or perhaps a menu of video-content items available from VOD1.

In line with the discussion above, the act of detecting that the MPD 100 is in a content-selection mode could involve detecting that the MPD 100 is in a mode in which it is likely that a user of the MPD 100 will select video content to watch. Further, the act of detecting that the MPD 100 is in a content-selection mode when the MPD 100 is not using VOD1 could involve detecting that the MPD 100 is not using VOD1 could involve the detecting occurring at a time when the MPD 100 is not currently presenting video content being provided by VOD1 and MPD 100 is not currently presenting a menu of the video-content items available from VOD1.

As noted above, various examples of this situation could exist. And the MPD 100 could detect the situation in various ways.

One example is when the MPD 100 has just powered on (e.g., transitioned from a standby or power-off mode to a full power-on mode where the MPD 100 is ready to present video content), as in that state the MPD 100 would likely not yet be using any VOD service and a user of the MPD 100 would be likely to select video content to watch. The act of the MPD 100 detecting this situation could thus involve the MPD 100 detecting whatever event the MPD 100 would normally detect as an indication that the MPD 100 has just powered on, to trigger to start the MPD's normal power-on and startup routine.

Another example is when the MPD 100 is presenting a VOD-service-selection menu (e.g., as shown in FIG. 2) that offers various VOD services for user selection, as in that state the MPD 100 would not yet be presenting video content of any particular VOD service and it is likely that a user of the MPD 100 would select video content to watch—by selecting a VOD service and then selecting a video-content item provided by the selected VOD service.

The MPD 100 could detect in various ways that the MPD 100 is currently presenting a VOD-service-selection menu.

For instance, if media player 106 of the MPD 100 is providing the VOD-service-selection menu for presentation by the MPD 100, then the MPD 100 would programmatically be aware of that fact. For example, the media player 106 could notify the client-side VOD-trigger logic 112 that the media player 106 is providing the VOD-service-selection menu for presentation by the MPD 100. Or if the external media player 108 is providing the VOD-service selection menu for presentation by the MPD 100, the external media player 108 might send a control signal (e.g., via HDMI signaling) to the MPD 100 to notify the MPD 100 of that fact.

Alternatively, the MPD 100 could apply any of various image recognition techniques to determine that that a video frame currently being presented by the MPD 100 is the VOD-service-selection menu. Here, for instance, the MPD 100 could regularly grab video frames that the MPD 100 is presenting and could analyze the video frames in an effort to detect in a frame one or more predefined images, objects, or attributes indicative of the MPD 100 presenting a VOD-service-selection menu. The MPD 100 could apply one or more well-known pattern recognition and template-matching techniques for this purpose.

For example, each of various media players such as those noted above may have a predefined, distinctive format of its VOD-service-selection menu, which might include characteristics such as a distinctive arrangement of VOD-service objects, a distinctive shape or proportions of VOD-service objects, and distinctive text, images, and color-schemes, among other possibilities. With the arrangement shown in FIG. 2, for instance, the video frame of an example VOD-service-selection menu might have a title bar with a distinctive background color, a media-player name at a specific location in the frame, a media-player logo at a specific location in the frame, and VOD-service selection objects of particular shapes, orientations, and relative orientations. Further, a telltale sign of a VOD-service-selection menu may be the presence in the video frame of the logos and/or name of multiple VOD services, such as predefined VOD-service objects having the names, logos, color schemes, and/or other attributes specific to various VOD services.

The MPD 100 could be pre-provisioned with predefined image templates and other such data that defines distinctive characteristics of the VOD-service-selection menu respectively of each of various media players such as those noted above. The MPD 100 could thus regularly perform image recognition based on the templates and/or other data to determine if and when a video frame that the MPD 100 is currently presenting is such a VOD-service-selection menu.

Further, the MPD 100 could likewise use any of various image recognition techniques to detect that a presented frame depicts the logos of multiple different VOD service providers, which could indicate that a user has a choice of which VOD service provider to select, and thus that the MPD is in a content-selection mode. And the MPD 100 could similarly use any of various image recognition techniques to detect that a user is navigating through various VOD-service objects on such a menu, such as by detecting scrolling and/or navigating through the VOD-service objects.

Still alternatively, the MPD 100 could use any of various ACR techniques to detect that the MPD 100 is currently presenting such a VOD-service-selection menu.

For example, the MPD 100 could regularly generate digital video fingerprints of video frames that the MPD 100 is presenting. And the MPD 100 could compare those digital video fingerprints with pre-established reference video fingerprints representing VOD-service selection menus and deem a sufficient fingerprint match to indicate that the MPD 100 is presenting a VOD-service-selection menu. Or the MPD 100 could transmit its generated digital video fingerprints to a network-based ACR server 114, which could compare the digital video fingerprints with pre-established reference video fingerprints and could signal to MPD 100 upon finding a match indicating that the MPD 100 is presenting a VOD-service-selection menu. Any of various known fingerprinting and fingerprint-matching techniques could be used for this purpose.

Yet alternatively, by evaluating the video that the MPD 100 presenting, the MPD 100 could detect within the video a watermark or other steganographic data that indicates that the video being presented is a VOD-service-selection menu, which could indicate to the MPD 100 that the MPD 100 is currently presenting the VOD-service-selection menu. Or the MPD 100 could detect such a watermark and could report the watermark to ACR server 114, and the ACR server could responsively signal to the MPD 100 to indicate, based on the detected watermark, that MPD 100 is presenting a VOD-selection menu. Any of various watermarking and watermark-detecting techniques could be used for this purpose.

In addition, the MPD 100 detecting that the MPD 100 is in a content-selection mode when the MPD 100 is not currently using VOD1 could involve the MPD 100 detecting that the MPD is presenting a VOD-service selection menu and that presenting of the VOD-service-selection menu currently highlights for user selection a VOD service other than VOD1. For example, as shown in FIG. 2, the VOD-service-selection menu that the MPD 100 is presenting may currently have the VOD-service object of VOD2 highlighted for user selection, perhaps as a result of a user having navigated to VOD2 for possible selection, pending the user then engaging an OK button or the like to select VOD2. FIG. 2 shows this highlighting as an outer glow around the VOD2 object in the menu, but other forms of highlighting are possible as well.

As above, the MPD could apply any of various image recognition techniques to determine that the VOD-service-selection menu currently being presented has a VOD service other than VOD1 highlighted for user selection. For instance, the MPD could evaluate a video frame to detect the VOD-service object of VOD2 based on image characteristics distinctly related to VOD2, and the MPD could further detect around that VOD-service object an outer glow indicating that the VOD2 object is highlighted for user selection. Other examples are possible as well.

Still another example of the MPD 100 being in a content-selection mode when the MPD 100 is not using VOD1 is where the MPD 100 is presenting a video-content-selection menu of another VOD service such as VOD2 (e.g., as shown in FIG. 3). In that situation, it is also likely that a user of the MPD 100 will select a video-content item to watch, and by definition the MPD 100 in that situation is not using VOD1 as the MPD is presenting a video-content-selection menu of the other VOD service instead.

The MPD 100 could detect in various ways that the MPD 100 is currently presenting a video-content-selection menu of VOD2.

For instance, if media player 106 of the MPD 100 is providing the video-content-selection menu of VOD2 for presentation by the MPD 100, then the MPD 100 would programmatically be aware of that fact. For example, the media player 106 could notify the client-side VOD-trigger logic 112 that the media player 106 is providing the video-content-selection menu of VOD2 for presentation by the MPD 100. Or if the external media player 108 is providing the video-content-selection menu of VOD2 for presentation by the MPD 100, the external media player 108 might send a control signal (e.g., via HDMI signaling) to the MPD 100 to notify the MPD 100 of that fact.

Alternatively, as with detecting the VOD-service-selection menu, the MPD 100 could apply any of various image recognition techniques, such as pattern-recognition and template-matching, to determine that that a video frame currently being presented by the MPD 100 is the video-content-selection menu of VOD2. Similarly here, for instance, the MPD 100 could regularly grab video frames that the MPD 100 is presenting and could analyze the video frames in an effort to detect in a frame one or more predefined images, objects, or attributes indicative of the MPD 100 presenting a video-content-selection menu of VOD2.

For example, VOD2 may have a predefined distinctive format of its video-content-selection menu (possibly varying based on the media player being used), which might include characteristics such as a distinctive arrangement of video-content objects, a distinctive shape or proportions of video-content objects, and distinctive text, images, and color-schemes, among other possibilities. With the arrangement shown in FIG. 3, for instance, the video frame of an example video-content-selection menu might have a title bar offset from the top of the frame and having a distinctive background color the logo of VOD2 at its left end, having text at the left side of the frame listing various available video-content genres, having video-content objects of particular shapes, proportions, and relative orientations.

The MPD 100 could be pre-provisioned with predefined image templates and other such data that defines distinctive characteristics of the video-content-selection menu of VOD2 (and likewise of other VOD services). The MPD 100 could thus regularly perform image recognition based on the templates and/or other data to determine that a video frame that the MPD 100 is currently presenting is the video-content-selection menu of VOD2.

Yet alternatively, the MPD 100 could use any of various ACR techniques to detect that the MPD 100 is currently presenting such a video-content-selection menu of VOD2. For example, the MPD 100 could use fingerprint or watermark analysis like that discussed above for this purpose.

Still another example of the MPD 100 being in a content-selection mode when the MPD 100 is not using VOD1 is where the MPD 100 has just finished presenting video content provided by another VOD service, such as VOD2. A specific example of this situation could be where the MPD 100 is presenting closing credits of a video-content item of VOD2 and perhaps where the MPD 100 is presenting a prompt for user approval for MPD 100 to present a next episode or other related video-content item of VOD2 (e.g., "continue watching", "watch next episode", or the like). It is likely in such situations that a user of the MPD 100 will select a next video-content item to watch, and the MPD 100 in that situation is not using VOD1 but is rather using VOD2.

The MPD 100 could detect that the MPD 100 has just finished presenting video-content provided by VOD2 in various ways.

By way of example, if media player 106 of the MPD 100 was playing the video-content item from VOD2 for presentation by the MPD 100, the MPD 100 could be programmatically aware of that fact and might further receive from VOD2 a signaling message that indicates that the video-content item has ended, such as that it is currently rolling closing credits or the like. Or if the external media player 108 was playing the video-content item from VOD2 for presentation by the MPD 100, the external media player 108 might send a control signal (e.g., via HDMI signaling) to the MPD 100 to notify the MPD 100 that the video-content item has ended.

Alternatively, if VOD2 presents a VOD2-distinctive prompt at the end of playout of a given video-content item, prompting the user to select a next video-content item for VOD2 to provide, the MPD 100 could apply any of various image recognition techniques, such as pattern-recognition and template-matching, to detect that a video frame currently being presented by the MPD 100 includes that VOD2-distinctive prompt. For instance, the MPD 100 could regularly grab video frames that the MPD 100 is presenting and could analyze the video frames to detect in a frame such a VOD2-distinctive prompt.

Further, here too, the MPD 100 could use any of various ACR techniques to detect that the MPD 100 has finished presenting a video-content item from VOD2. For example, the MPD 100 could use fingerprint or watermark analysis like that discussed above for this purpose.

In response to at least the MPD 100 detecting that the MPD 100 is in the content-selection mode when the MPD is not currently using VOD1, the MPD 100 could then generate and present a prompt for user approval to have the MPD 100 present video content of VOD1. This prompt could be an interactive prompt, presenting information to the user and presenting a button or other actionable user-interface object that a user could engage in order to provide approval for the MPD 100 to present the video content of VOD1.

The MPD 100 could present this prompt as a video-overlay superimposed over the video the MPD 100 is currently presenting. Further, the MPD 100 could position this video-overlay at any of various places in the video frame. For instance, the MPD 100 could position the video overlay in a pop-up bar along an edge of the video frame. Or the MPD 100 could position the video overlay at another location, possibly in relation to an object that triggered presentation of the prompt, among other possibilities.

Figure 4:
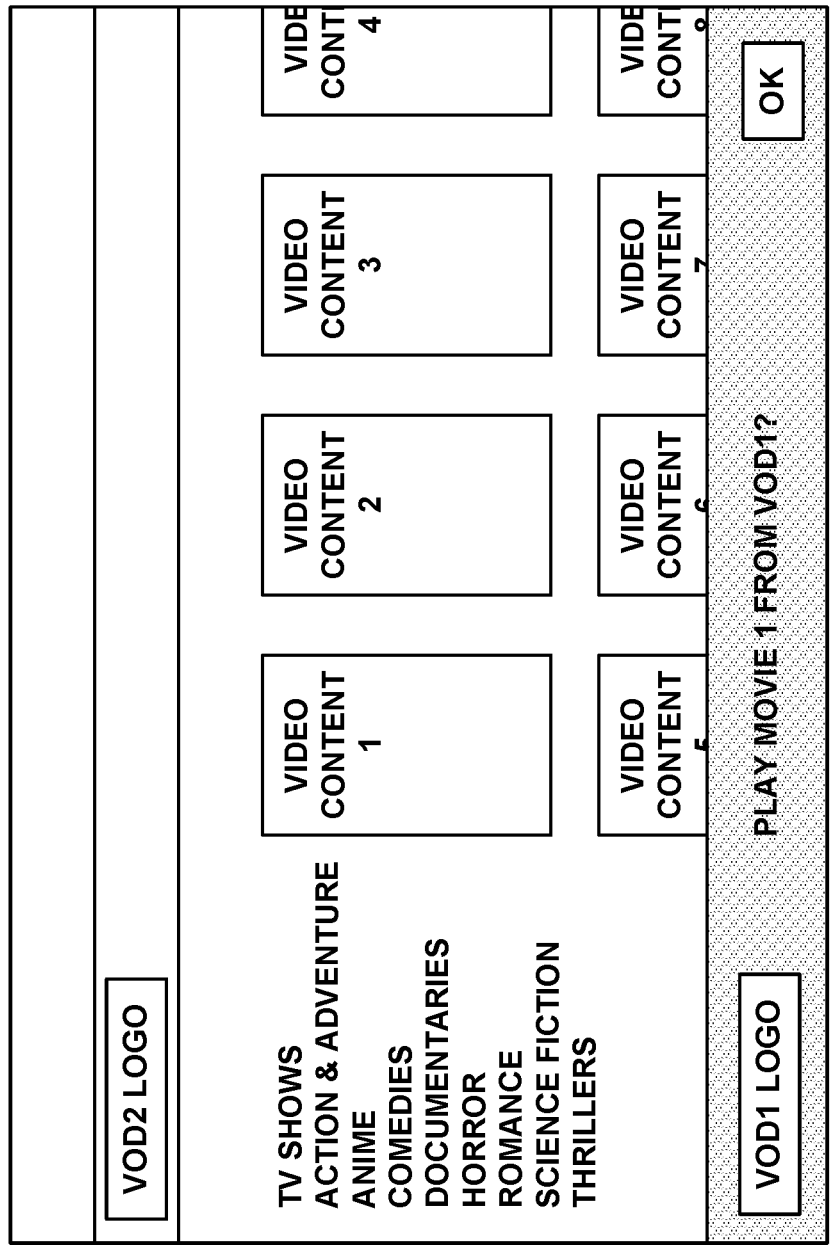
FIG. 4 is an illustration showing the menu of FIG. 3 with an overlaid prompt for user approval to have the MPD present video content of another VOD service.

FIG. 4 illustrates an example such prompt superimposed in a bar at the bottom edge of the video frame over the VOD2 content-selection frame of FIG. 3. As shown, the example prompt presents a logo or other brand identity of VOD1, and the prompt presents a text-based invitation for the user to have the MPD 100 present MOVIE1 streamed from VOD1. Further, the example prompt presents an OK button that the user could engage using a remote control or other mechanism, to provide user approval in response to the prompt.

The MPD 100 could configure the OK button of this prompt as an actionable hyperlink to the URI of MOVIE1 to be streamed from VOD1. Thus, when the user engages the OK button to provide approval for the MPD 100 to present MOVIE1 from VOD1, the MPD 100 could responsively initiate streaming of MOVIE1 from VOD1. For instance, the MPD 100 could use an API of media player 106 as discussed above to cause media player 106 to establish a streaming media session with VOD1 and to begin receiving from VOD1 and playing MOVIE1 for presentation by the MPD 100.

In a further aspect as noted above, the MPD 100 could interact with a VOD-trigger server 116 via the transport network 104 or another channel, and the VOD-trigger server 116 could facilitate causing the MPD 100 present the prompt for user approval to have the MPD 100 present the video content of VOD1, such as by transmitting a directive to the MPD 100 to which the MPD 100 would respond by taking various actions disclosed herein and/or by transmitting information to the MPD 100 that the MPD 100 could use as a basis to carry out various disclosed actions.

For example, once the MPD 100 detects that the MPD 100 is in the content-selection mode when the MPD 100 is not currently using VOD1, the MPD 100 transmit a notification of that fact to the VOD-trigger server 116. And the VOD-trigger server could respond to that notification by transmitting to MPD 100 various information to facilitate the MPD's presentation of the prompt. This information could include a markup document that defines text, images, and an actionable hyperlink to the URI of MOVIE1 from VOD1. Or the information might simply be the URI of MOVIE1, which the MPD 100 might apply as the target URI in the prompt that the MPD 100 presents. Upon receipt of this information from the VOD-trigger server, the MPD 100 could then responsively use the received information as a basis to configure and present the prompt for user approval.

In yet a further aspect, ACR could be used as a basis to identify a preferred type of video content to prompt for user approval for the MPD 100 to present. In particular, the MPD 100 and/or ACR server 114 could apply ACR based on content presented by the MPD 100 and/or by one or more associated MPDs (e.g., MPDs associated with the same user, household, or other media-consumption entity) over time, to determine that the MPD and/or associated MPDs have had a tendency to present a certain genre or other type of media content. And based on this determination, the MPD 100 could configure the prompt for user approval to be a prompt for user approval for the MPD 100 to present content of the determined type.

By way of example, regularly as MPD 100 and/or one or more associated MPDs present video content, such as from one or more VOD services and/or from other video content providers or sources, each such MPD could generate digital video fingerprints of the content being presented and could transmit the fingerprints to the ACR server 114 for analysis. Further, the ACR server 114 could be provisioned with reference video fingerprints of various video-content items and with data specifying the content type (e.g., genre) respectively of each such item. The ACR server 114 could thus compare the digital video fingerprints provided by the MPD with the reference video fingerprints in an effort to find a fingerprint match. And upon finding a fingerprint match, the ACR server 114 could determine the associated content type of the content presented by the MPD. Alternatively, watermarking or other ACR techniques could be used.

Compiling this content-type information over time, such as over a recent sliding window, the ACR server 114 and/or one or more other entities could then identify a trend for the MPD 100 and/or one or more associated MPDs to present a particular type of content, representing a user preference for that type of content. And based on this identified preference, the VOD-trigger server 116 could select a particular video-content item of the determined content type that is available for streaming from VOD1 and could provide the MPD 100 with a URI of that content item and with associated prompting information for use by the MPD 100 as a basis to generate and present the prompt for user approval. For instance, the VOD-trigger server 116 could refer to data that lists various video-content items available from VOD1, categorized by type (e.g., genre), and the VOD-trigger server 116 could select a video-content item from that data based on the selected video-content item being of the determined type. The VOD-trigger server could then provide the MPD 100 with a URI of the selected video-content item. The MPD 100 could then accordingly generate and present the prompt.

Further, this identification of content-type preference could be keyed to time of day and/or one or more other context factors.

For example, the ACR server 114 and/or one or more other entities could correlate the determined preference with a time of day when the MPD 100 and/or one or more other associated MPDs tends to present content of the determined type. With this time information, the VOD-trigger server 116 could then determine that the time when the MPD 100 detects that the MPD 100 is in the content-selection mode is a determined time of day when the MPD 100 and/or one or more associated MPDs prefers a particular content. And in response, the VOD-trigger server 116 could provide the MPD 100 with a URI of a video-content item of that type available for streaming from VOD1, and MPD 100 could accordingly present the prompt for user approval to have MPD 100 present that video-content item.

Note also that the prompt for user approval that the MPD 100 presents could instead be a prompt for user approval more generally to have the MPD 100 transition to use VOD1, rather than a prompt for the MPD 100 to specifically present a given video-content item from VOD1. For instance, the prompt could invite the user to engage a button that would cause media player 106 to transition from not using VOD1 to presenting a video-content-selection menu of VOD1. And upon user engaging of that button, the media player 106 could proceed accordingly, so that the MPD 100 would then present the video-content-selection menu of VOD1.

Figure 5:
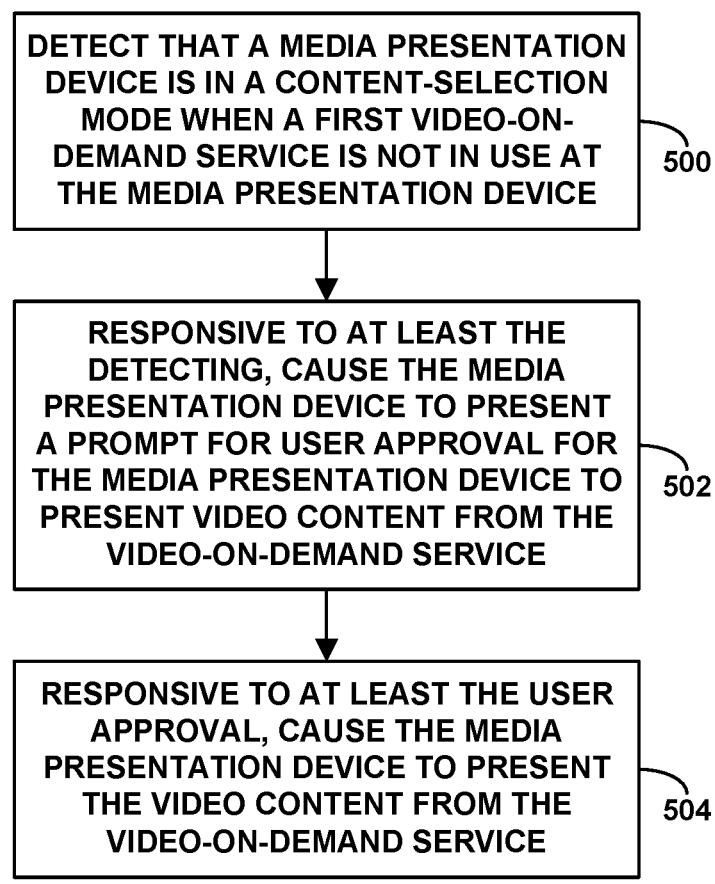
FIG. 5 is a flow chart depicting operations that can be carried out in accordance with the present disclosure.

FIG. 5 is a flow chart depicting a method that could be carried out in accordance with the present disclosure, to trigger use of a first VOD service by an MPD such as a television or other device. This method could be carried out by a computing system, which could include components at the MPD and/or in one or more other entities. For instance, the computing system could be implemented at least in part by a processing unit at the MPD executing stored program instructions. Further, the computing system could be implemented at least in part by a processing unit at a network server in communication with the MPD. Other implementations are possible as well.

As shown in FIG. 5, at block 500, the method includes the computing system detecting that the MPD is in a content-selection mode, the detecting being conducted when the first VOD service is not in use at the MPD. At block 502, the method then includes, responsive to at least the detecting, the computing system causing the MPD to present a prompt for user approval for the MPD to present video content from the first VOD service. And at block 504, the method includes, responsive to at least the user approval, causing the MPD to present the video content from the VOD service.

In line with the discussion above, the first VOD service not being in use at the MPD could involve (i) the MPD not presenting any video content from the first VOD service and (ii) the MPD not presenting any content-selection menu of the first VOD service.

Further, the act of detecting that MPD is in the content-selection mode could involve detecting, based on machine analysis (e.g., image recognition and/or ACR processing) of video content presented by the MPD, that the MPD is in the content-selection mode. For instance, the detecting could involve using template matching as a basis to detect that the video content presented by the MPD matches video content pre-associated with the MPD being in the content-selection mode.

By way of example, the detecting could involve detecting that the MPD is presenting a VOD-service-selection menu that includes, as menu items, a plurality of VOD services, for user selection of a VOD service from among the plurality of VOD services, perhaps specifically when the VOD-service-selection menu currently highlights for selection a second VOD service of the plurality of VOD services.

Alternatively, the detecting could involve detecting that the MPD is presenting a content-selection menu of a second VOD service, in which case causing the MPD to present the prompt for user approval for the MPD to present video content from the first VOD service could help to facilitate transition from use of the second VOD service to use of the first VOD service.

Still alternatively, the detecting could involve detecting that the MPD has just finished presenting a content item, such as a television program or a movie, from a second VOD service. And yet alternatively, the detecting could involve detecting that the MPD has just powered on.

In addition, as noted above, the method could additionally involve identifying, based on ACR of content presented by one or more MPDs, a preference for a particular content type, and, based on the identifying, configuring the prompt for user approval for the MPD to present video content from the first VOD service to be a prompt for user approval for the MPD to present video content that is of the identified content type. Here, for instance, the one or more MPDs could be the MPD and/or one or more MPDs each associated with a same user account as the MPD.

As further discussed above, the act of identifying the preference for the particular content type could involve comprises identifying the preference for the particular content type based on determining that the one or more media presentation devices have presented content of the particular content type. More particularly, the identifying could involve identifying the preference for the particular content type based on determining that the one or more content-presentation devices have presented content of the particular content type at a particular time of day, and wherein configuring the prompt is further based on the detecting being at the particular time of day as well.

Still further, as discussed above, the computing system could include a processing unit at the MPD. And in that case, the method could additionally involve responding to the detecting by notifying a network server of the detecting, in which case the act of causing the MPD to present the prompt could involve receiving from the network server, in response to the notifying, a message to which the processing unit responds by causing the MPD to present the prompt.

Yet further, as discussed above, the act of presenting the prompt for user approval for the MPD to present video content from the first VOD service could involve presenting a video-content overlay that sets forth a message prompting for the user approval for the MPD to present video content from the first VOD service.

Figure 6:
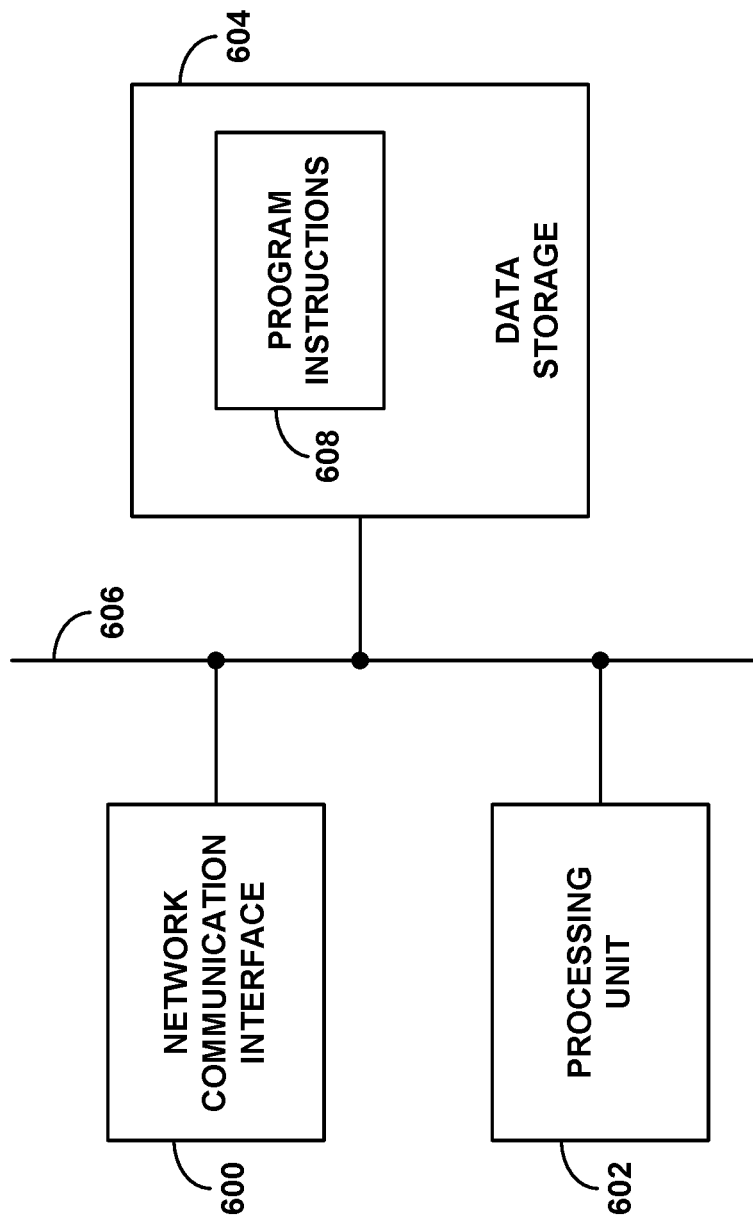
FIG. 6 is a simplified block diagram of an example computing system.

FIG. 6 is next a simplified block diagram of an example computing system operable in accordance with the present disclosure. This system could represent one or more entities (e.g., alone or in combination) as discussed above. As shown in FIG. 5, the example system includes at least one network communication interface 600, at least one processing unit 602, and at least one instance of non-transitory data storage 604, any or all of which could be integrated together in various ways or, as shown, communicatively linked together by one or more system buses, networks, and/or other connection mechanisms 606.

Each network communication interface 600 could comprise one or more network connection mechanisms to facilitate communication on a network such as network 104 discussed above, and/or for engaging in direct or networked communication with one or more other local or remote entities. As such, the network communication interface 600 could comprise a wireless or wired Ethernet interface or other type of network interface, for engaging in IP communication and/or other type of network communication, as well as network communication program logic for supporting such communication.

Each processing unit 602 could comprise one or more general purpose processors (e.g., microprocessors) and/or one or more specialized processors (e.g., application specific integrated circuits). And each instance of non-transitory data storage unit 604 could comprise one or more volatile and/or non-volatile storage components, such as optical, magnetic, or flash storage.

As shown, the non-transitory data storage 604 then stores program instructions 608, which could be executable by any of the one or more processing units 602 to carry out various operations described herein.

Various features described above could be applied in this context as well, and vice versa.

Figure 7:
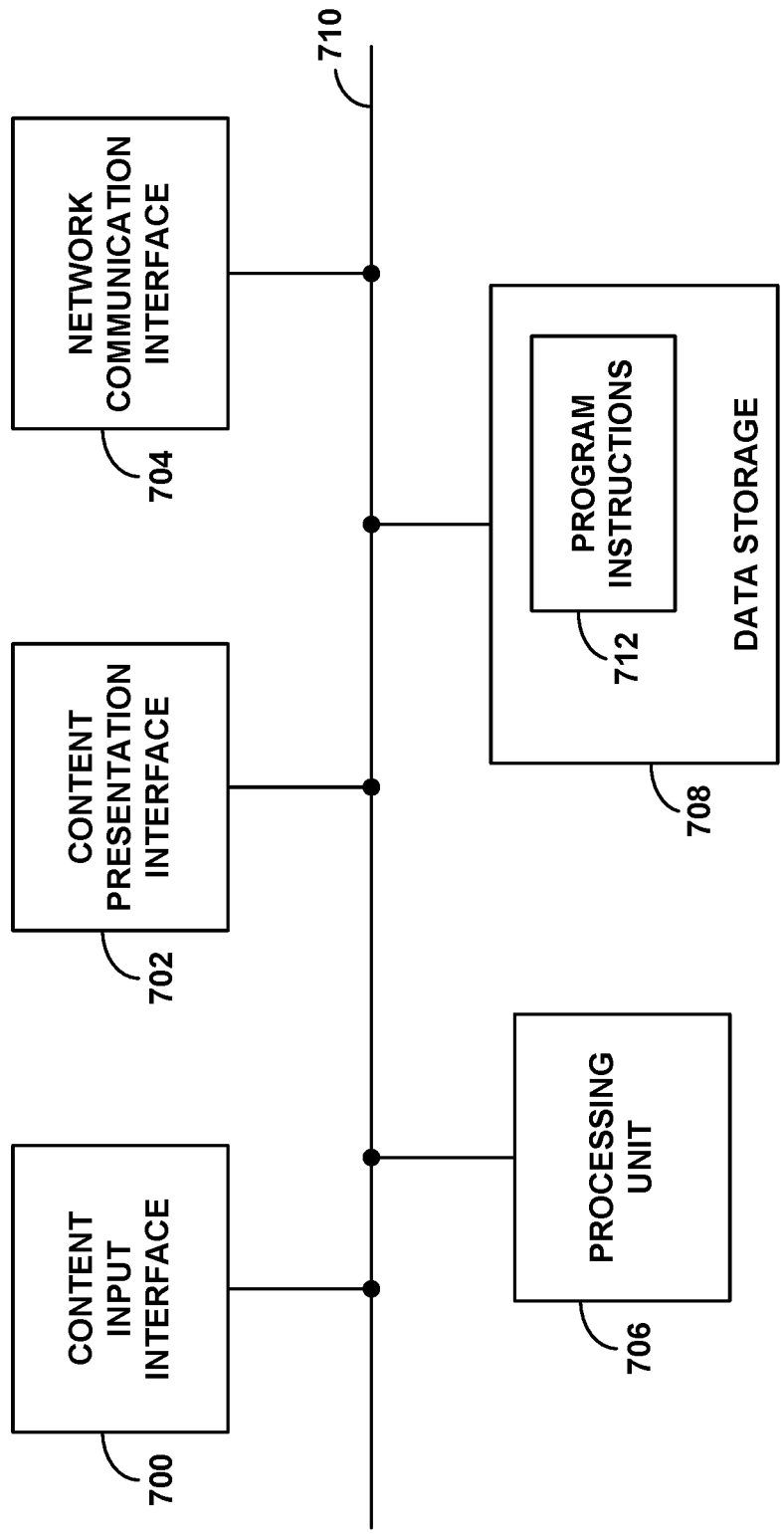
FIG. 7 is a simplified block diagram of an example media presentation device.

Finally, FIG. 7 is next a simplified block diagram of an example MPD operable in accordance with the present disclosure. In line with the discussion above, this MPD could take various forms. For instance, it could be a television, computer monitor, or other device that operates to receive and render video content. Numerous other examples are possible as well.

As shown in FIG. 7, the example media presentation device includes at least one each of a media input interface 700, a media presentation interface 702, a network communication interface 704, a processing unit 706, and non-transitory data storage 708, any or all of which could be integrated together or, as shown, communicatively linked together by a system bus, network, or other connection mechanism 710.

Media input interface 700 could comprise a physical communication interface for receiving media content to be presented by the MPD. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 702 could comprise one or more components to facilitate presentation of the received media content. By way of example, the media presentation interface could comprise a user interface such as a display screen and a loudspeaker, as well as one or more drivers or other components for processing the received media content to facilitate presentation of the content on the user interface.

Network communication interface 704 could comprise a physical network connection mechanism to facilitate communication on a network such as network 104 discussed above, and/or for engaging in direct or networked communication with one or more other local or remote entities. As such, the network communication interface could comprise a wireless or wired Ethernet interface or other type of network interface, for engaging in IP communication and/or other type of network communication.

Further, processing unit 706 could then comprise one or more general purpose processors (e.g., microprocessors) and/or one or more specialized processors (e.g., application specific integrated circuits). And non-transitory data storage 708 could comprise one or more volatile and/or non-volatile storage components, such as optical, magnetic, or flash storage. Further, as shown, non-transitory data storage 708 stores program instructions 712, which could be executable by processing unit 706 to carry out various MPD operations described here.

It should also be understood that the present disclosure additionally contemplates a non-transitory computer readable medium that stores, has encoded thereon, or otherwise embodies program instructions executable to carry out such operations as well.

Exemplary embodiments have been described above. Those skilled in the art will understand, however, that changes and modifications may be made to these embodiments without departing from the true scope and spirit of the invention.

What is claimed is:

1. A computing system for triggering use of a first video-on-demand (VOD) service by a media presentation device (MPD), the computing system comprising:
   a processing unit;
   non-transitory data storage; and
   program instructions stored in the non-transitory data storage and executable by the processing unit to carry out operations including:
      detecting, when the first VOD service is not in use at the MPD, that the MPD is in a content-selection mode presenting a VOD-service-selection menu that currently highlights for selection a second VOD service, wherein detecting that the MPD is in the content-selection mode comprises detecting, based on machine analysis of video content presented by the MPD, that the MPD is in the content-selection mode,
      responsive to at least the detecting, causing the MPD to present a prompt for user approval for the MPD to present video content from the first VOD service, and
      responsive to at least the user approval, causing the MPD to present the video content from the first VOD service.

2. The computing system of claim 1, wherein the first VOD service not being in use at the MPD comprises (i) the MPD not presenting any video content from the first VOD service and (ii) the MPD not presenting any content-selection menu of the first VOD service.

3. The computing system of claim 1, wherein detecting that the MPD is in the content-selection mode presenting the VOD-service-selection menu comprises detecting that the MPD is presenting, as the VOD-service-selection menu, a VOD-service-selection menu that includes, as menu items, a plurality of VOD services, for user selection of a VOD service from among the plurality of VOD services.

4. The computing system of claim 1, wherein detecting that the MPD is in the content-selection mode comprises detecting that the MPD has just finished presenting a content item from the second VOD service, the content item being selected from the group consisting of a television program and a movie.

5. The computing system of claim 1, wherein detecting, based on machine analysis of video content presented by the MPD, that the MPD is in the content-selection mode comprises:
   using template matching as a basis to detect that the video content presented by the MPD matches video content pre-associated with the MPD being in the content-selection mode.

6. The computing system of claim 1, wherein detecting that the MPD is in the content-selection mode comprises detecting that the MPD has just powered on.

7. The computing system of claim 1, wherein the operations further include:
   identifying, based on automatic content recognition (ACR) of content presented by one or more media presentation devices, a preference for a particular content type; and
   based on the identifying, configuring the prompt for user approval for the MPD to present video content from the first VOD service to be a prompt for user approval for the MPD to present video content that is of the identified content type.

8. The computing system of claim 7, wherein the one or more media presentation devices is the MPD.

9. The computing system of claim 7, wherein the MPD is associated with a user account, and wherein the one or more media presentation devices includes a plurality of media presentation devices associated with the user account.

10. The computing system of claim 7, wherein identifying the preference for the particular content type comprises identifying the preference for the particular content type based on determining that the one or more media presentation devices have presented content of the particular content type.

11. The computing system of claim 7, wherein identifying the preference for the particular content type comprises identifying the preference for the particular content type based on determining that the one or more media presentation devices have presented content of the particular content type at a particular time of day, and wherein configuring the prompt is further based on the detecting being at the particular time of day as well.

12. The computing system of claim 1, wherein the computing system comprises a processing unit at the MPD, wherein the operations further include:
   responding to the detecting by notifying a network server of the detecting,
   wherein causing the MPD to present the prompt comprises receiving from the network server, in response to the notifying, a message to which the processing unit responds by causing the MPD to present the prompt.

13. The computing system of claim 1, wherein presenting the prompt for user approval for the MPD to present video content from the first VOD service comprises presenting a video-content overlay that sets forth a message prompting for the user approval for the MPD to present video content from the first VOD service.

14. The computing system of claim 1, wherein the MPD comprises a television.

15. A method to trigger use of a first video-on-demand (VOD) service by a media presentation device (MPD), the method comprising:
- detecting by a computing system, when the first VOD service is not in use at the MPD, that the MPD is in a content-selection mode presenting a VOD-service-selection menu that currently highlights for selection a second VOD service, wherein detecting that the MPD is in the content-selection mode comprises detecting, based on machine analysis of video content presented by the MPD, that the MPD is in the content-selection mode; and
- responsive to at least the detecting, causing by the computing system the MPD to present a prompt for user approval for the MPD to present video content from the first VOD service.

16. The method of claim 15, further comprising:
- receiving the user approval in response to the presented prompt; and
- responsive to at least the received user approval, causing the MPD to present the video content from the first VOD service.

17. A non-transitory computer-readable medium having encoded thereon program instructions executable by a processing unit to carry out operations for triggering use of a first video-on-demand (VOD) service by a media presentation device (MPD), the operations comprising:
- detecting, when the first VOD service is not in use at the MPD, that the MPD is in a content-selection mode presenting a VOD-service-selection menu that currently highlights for selection a second VOD service, wherein detecting that the MPD is in the content-selection mode comprises detecting, based on machine analysis of video content presented by the MPD, that the MPD is in the content-selection mode;
- responsive to at least the detecting, causing the MPD to present a prompt for user approval for the MPD to present video content from the first VOD service; and
- responsive to at least the user approval, causing the MPD to present the video content from the first VOD service.

* * * * *